United States Patent [19]
Sensui

[11] Patent Number: 5,870,637
[45] Date of Patent: Feb. 9, 1999

[54] AUXILIARY LIGHT EMITTING DEVICE AND FOCUSING CONDITION DETECTING DEVICE

[75] Inventor: Takayuki Sensui, Tokyo, Japan

[73] Assignee: Asahi Kogaku Kogyo Kabushiki Kaisha, Tokyo, Japan

[21] Appl. No.: 863,597

[22] Filed: May 27, 1997

[30] Foreign Application Priority Data

May 28, 1996 [JP] Japan .................................. 8-156041

[51] Int. Cl.$^6$ .................................................. G03B 13/36
[52] U.S. Cl. .......................................................... 396/109
[58] Field of Search ............................. 396/109, 91, 108, 396/106

[56] References Cited

U.S. PATENT DOCUMENTS

| 4,688,919 | 8/1987 | Ogawa et al. . |
| 4,771,308 | 9/1988 | Tejima et al. . |
| 4,870,442 | 9/1989 | Tejima et al. . |
| 4,958,180 | 9/1990 | Matsui et al. ............................ 396/109 |

FOREIGN PATENT DOCUMENTS

| 60-168111 | 8/1985 | Japan . |
| 6-347710 | 2/1988 | Japan . |
| 6-382407 | 4/1988 | Japan . |

*Primary Examiner*—W. B. Perkey
*Attorney, Agent, or Firm*—Greenblum & Bernstein, P.L.C.

[57] ABSTRACT

An auxiliary light emitting device used in a focusing condition detecting device having a plurality of sensors is provided. The light emitting device includes a light emitter, which projects light having a plurality of light patterns. A controller is provided to control the light emitter to project the plurality of light patterns selectively, or sequentially. Further, the focusing condition detecting device determines whether the auxiliary light pattern should be projected for each of the sensors. The light pattern is projected when the object corresponding to a sensor has low contrast and low brightness. The sensors are driven synchronously with the projection of the corresponding light pattern.

23 Claims, 8 Drawing Sheets

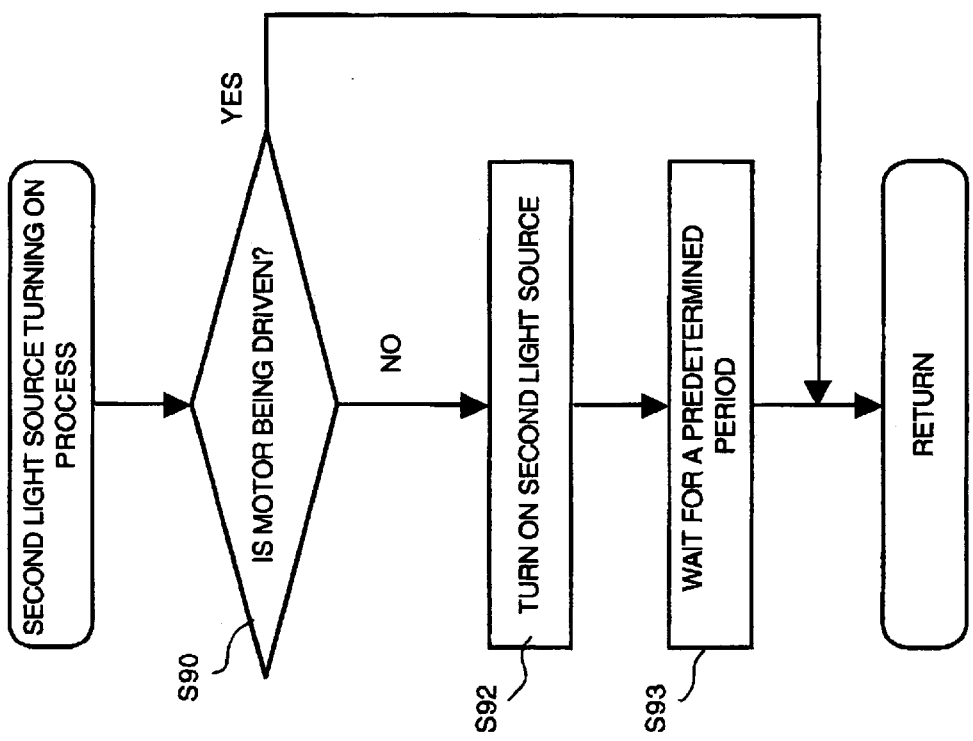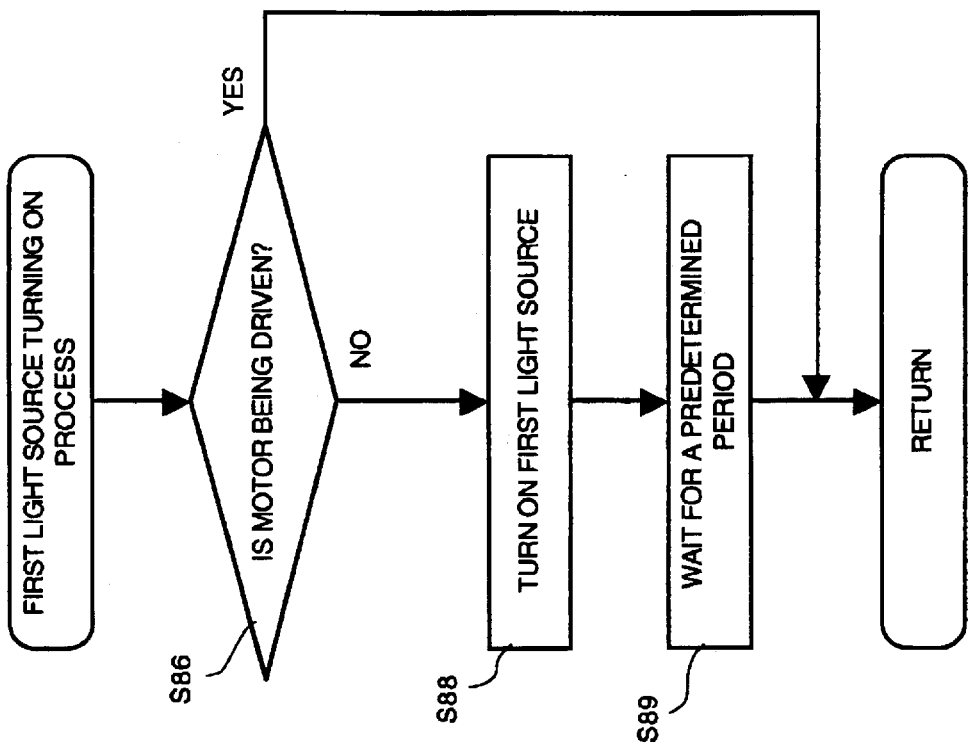

AUXILIARY LIGHT EMITTING DEVICE AND FOCUSING CONDITION DETECTING DEVICE

BACKGROUND OF THE INVENTION

The present invention relates to an auxiliary light emitting device used in a focusing condition detecting device for emitting an auxiliary light to an object, when a focusing condition is detected.

Conventionally, focusing condition detecting devices for detecting a focusing condition of a photographing lens with respect to an object are known. There are also proposed various cameras having an AF (automatic focusing) mechanism for achieving an in-focus condition by driving the focusing lens of the cameras in accordance with the detection result of the focusing condition detecting device. Although there are known various methods of detecting a focusing condition, a phase difference method is in particular widely used, among the various methods, by single-lens reflex cameras and the like as a method of obtaining a relatively accurate result over a wide range of a distance to an object.

The phase difference method of detecting a focusing condition by receiving a light ray from the object cannot detect a phase difference when an object is relatively dark, or when an object has a low contrast even if it is sufficiently bright. Accordingly, in such a situation, the focusing condition cannot be detected.

To cope with this problem, conventionally, there has been known an auxiliary light emitting device for emitting a light ray having a predetermined pattern towards an object when a focusing condition is detected using the phase difference method. The auxiliary light emitting device projects light having a specific pattern corresponding to an AF sensor for receiving light from the object. The pattern reflected by the object is received by the light receiving surface of an AF sensor as a pair of images through the optical system, and integrated by the AF sensor.

The focusing condition detecting device detects a defocus amount, i.e., the position of the image plane of the object on which the pattern is projected with respect to a film surface (or to a plane located at an equivalent to the film surface) based on an image signal corresponding to the pair of images received by the AF sensor by the phase difference method. Then an AF calculation is performed in order to determine the driving amount of a focusing lens so that the image plane of the object on which the pattern is projected coincides with the film surface.

A focusing condition is detected with respect to each of several focusing condition detecting areas assigned in a finder field, and the focusing lens is driven in accordance with a predetermined algorithm based on a result of a focusing condition detection process with respect to the plurality of AF areas.

FIG. 11 shows an example of the AF areas assigned in a finder field. In FIG. 11, a finder field 71 includes three AF areas 71L, 71C and 71R arranged approximately in an H-shape. AF sensors are arranged in correspondence to these AF areas 71L, 71C and 71R and detect focusing conditions according to the phase difference method by receiving light rays from an object in the respective AF areas 71L, 71C and 71R. Note, a light receiving element such as a CCD or the like is used as an AF sensor.

Next, an auxiliary light pattern will be described. When an object has a low contrast, light patterns as shown in FIG. 12 are projected to the object. That is, a first pattern P1 having a plurality of lines extending in an upward to downward direction in FIG. 12 is projected towards an area corresponding to the AF area 71C, and second patterns P2 each composed of a plurality of lines extending in a right to left direction in FIG. 12 are projected towards areas corresponding to the AF areas 71L, 71R. With this operation, a focusing condition of an object in the AF area 71C is detected by an AF sensor corresponding to the AF area 71C, and focusing conditions of objects corresponding to the AF areas 71L and 71R are detected by the AF sensors corresponding to these areas.

However, if the camera is of a lens-exchangeable type and/or if the photographing lens is a zoom lens, the focal length of the lens may change. When the focal length of a photographing lens increases, the range of the object covered by a finder field 71 is made relatively small as compared with a case in which the photographing lens has a short focal length. Since the magnification of an auxiliary light ray is unchanged in general, in a camera provided with a zoom lens, for example, even if the relationship between the respective AF areas 71L, 71C and 71R and the first and second light patterns P1, P2 is as shown in FIG. 12 when the zoom lens is located at a wide extremity, the movement of the zoom lens to a telephoto extremity changes the relationship therebetween as shown in FIG. 13. That is, since the focal length of the photographing lens increases, the area of the object covered by the finder field 71 is relatively narrowed, and as a result, objects viewed in all the AF areas 71L, 71C and 71R are illuminated with the light pattern P1 and the light patterns P2 are located outside of the AF areas 71L and 71R.

It is preferable for the detection of a focusing condition that a pattern generates a plurality of peaks (portions having a large quantity of light rays) along a direction in which an AF area extends. Therefore, when the relationship as shown in FIG. 13 is established between the AF areas 71L, 71C, 71R and the light patterns P1, P2, a focusing condition can be normally detected as to the AF area 71C, but, for the AF areas 71L and 71R, it is probable that the detection results are inaccurate.

In view of the above problems, it is an object of the present invention to provide an auxiliary light emitting device capable of emitting light rays having a plurality of patterns within respective AF areas even if the angle of view is changed as the focal length of the photographing lens changes and a region of the object whose focusing condition is to be detected is changed, and to provide a focusing condition detecting device using the above light emitting device.

SUMMARY OF THE INVENTION

For the above object, according to the invention, there is provided an auxiliary light emitting device for a focusing condition detecting device having a plurality of sensors for obtaining the focusing condition of a focusing lens with respect to an object based on a light ray from the object using a phase difference method. The auxiliary light emitting device comprises: a light emitter, which projects light having a plurality of light patterns respectively corresponding to the plurality of sensors to the object; and a controller, which drives the light emitter to emit any one of the plurality of light patterns sequentially.

Optionally, the light emitter may include a plurality of light emitting units, the plurality of light emitting units emitting different ones of the plurality of light patterns.

Yet further, each of the light emitting units includes a light source, a lens and a light shielding plate having a light transmitting pattern corresponding to one of the light patterns being formed on the light shielding plate.

Furthermore, the controller controls the plurality of light emitting units such that only one of the plurality of light emitting units is driven to emit a light pattern at one time.

Alternatively, the light emitter may include a light source; a lens; and a liquid crystal provided with transparent electrodes, the transparent electrode being arranged to form the plurality of light patterns depending on electricity applied thereto.

According to another aspect of the invention, there is provided a focusing condition detecting device used in a camera having a focusing lens, comprising: a plurality of sensors, each of the plurality of sensors outputting a signal representative of a focusing condition at different areas that are assigned within a finder field of the camera; a light emitter, which projects light having a plurality of light patterns to the object, the plurality of light patterns respectively corresponding to the plurality of sensors; and a controller, which drives the light emitter to sequentially emit the plurality of light patterns.

Optionally, the controller determines focusing conditions at the different areas assigned within the finder field based on the signal output from each of the plurality of sensors in accordance with a phase difference method.

Further, the plurality of sensors includes at least a first and a second sensor, the first and second sensors extending along a common plane in different directions. Moreover, the plurality of light patterns includes at least a first pattern and a second pattern, the first and second patterns corresponding to the first and second sensors.

Further, the first sensor is for detecting the focusing condition of an object located at a position corresponding to a substantially central portion of the finder field of the camera, and the light emitter emits the first pattern prior to the second pattern for the first sensor.

Furthermore, a pair of second sensors are provided, the pair of second sensors being located symmetrically with respect the first sensor for detecting focusing conditions of the object corresponding to positions symmetrical with respect to the center of the finder field, and wherein the light emitter emits the second pattern for the pair of second sensors.

Furthermore, the first pattern includes a plurality of lines of illuminating portions, the plurality of lines of illuminating portions extending in a direction perpendicular to a direction in which the first sensor extends, the plurality of lines of illuminating portions arranged along a direction in which the first sensor extends, and the second pattern includes a plurality of lines of second illuminating portions, the plurality of lines of second illuminating portions extending in a direction perpendicular to a direction in which the second sensor extends, the plurality of lines of second illuminating portions arranged along a direction in which the second sensor extends.

Preferably, the controller determines which of the plurality of light patterns is to be projected based on the focus condition detected with use of the plurality of sensors without projecting the plurality of light patterns.

Further, the controller determines that a light pattern is to be projected only when a focusing condition detected by a corresponding sensor indicates that an object has a low contrast and low brightness.

In another embodiment, the light emitter has a plurality of light emitting units, the plurality of light emitting units emitting different ones of the plurality of light patterns.

In another embodiment, the controller controls each of the plurality of sensors to receive light from the object synchronously with projection of the plurality of light patterns.

Further, at least two of the plurality of sensors correspond to the same one of the plurality of light patterns, and the controller drives the at least two sensors corresponding to the same light pattern simultaneously to receive light from the object when the same light pattern is projected.

In another embodiment, the controller may control the light emitter to project the plurality of light patterns sequentially.

According to another embodiment, the device is installed in a camera having a focusing lens, and the controller calculates amount of movement of the focusing lens based on the focusing condition detected by the plurality of sensors.

BRIEF DESCRIPTION OF THE DRAWINGS

FIG. 8 is a flowchart showing a First Light Soure Turning On Process according to an aspect of the present invention;

FIG. 9 is a flowchart showing a First Light Soure Turning On Process according to an aspect of the present invention;

DESCRIPTION OF THE PREFERRED EMBODIMENT

Figure 1:
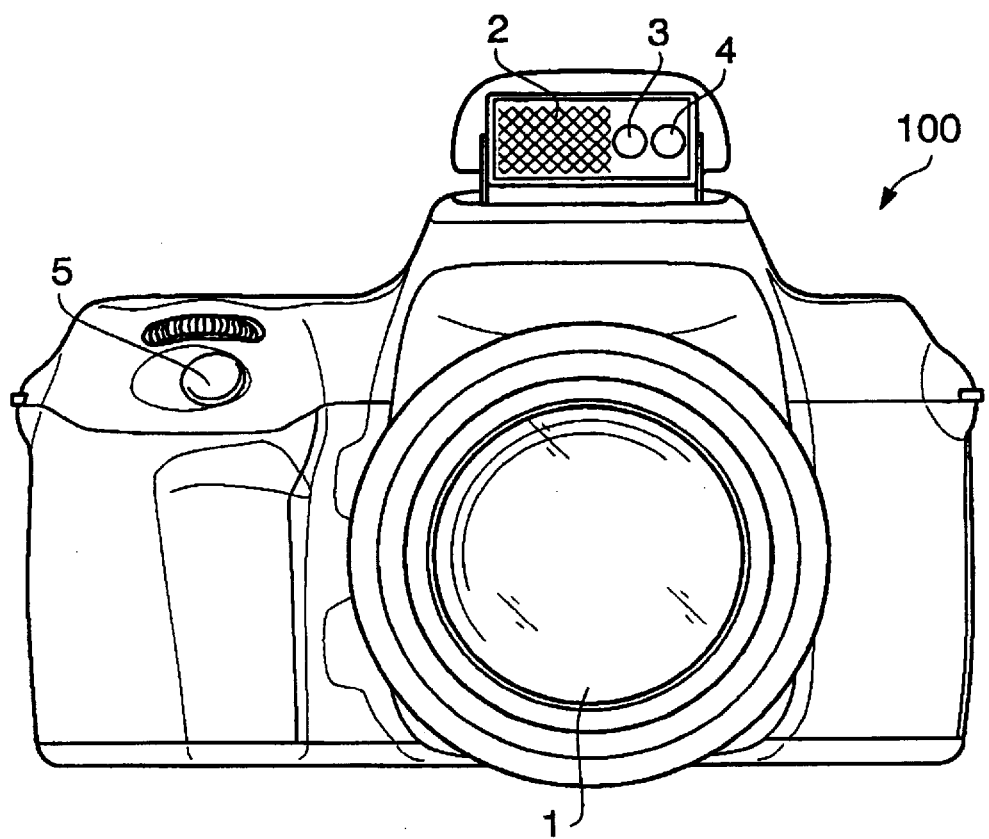
FIG. 1 is a front view of a camera according to an embodiment of the present invention.

FIG. 1 is a front elevational view of a camera 100 according to an embodiment of the present invention. The camera 100 is a single lens reflex camera provided with a photographing lens 1. A strobe 2 is disposed on an upper portion of a main body of the camera 100, and a first auxiliary light emitting unit 3 and a second auxiliary light emitting unit 4, which are characteristic features of the present invention, are disposed side by side, next to the strobe 2. In FIG. 1, numeral 5 denotes a shutter button 5. When the shutter button 5 is pressed halfway, a photometry process and focusing condition detection process are carried out, whereas when the shutter button 5 is fully pressed, photographing is carried out.

Figure 2:
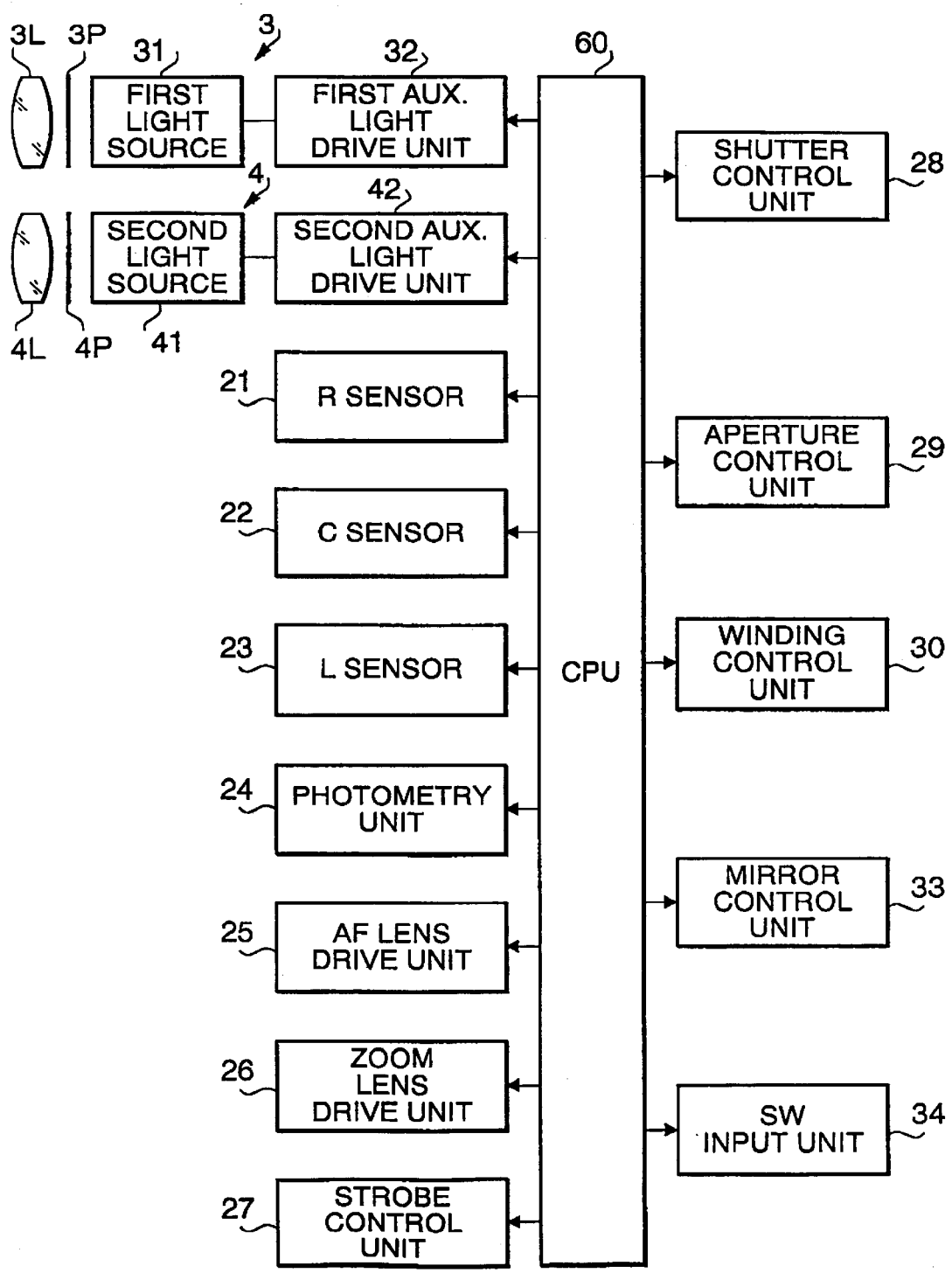
FIG. 2 is a block diagram showing a control system of the camera shown in FIG. 1.

FIG. 2 is a block diagram showing a control system of the camera 100. The camera 100 has a CPU 60 for controlling the entire operation thereof and further, respective drive units and control units operate under the control of the CPU 60.

A photometry unit 24 measures the brightness of an object. An aperture value which is used by an aperture control unit 29 and a shutter speed which is used by a shutter control unit 28 are calculated by the CPU 60 based on the result of a photometry process executed by the photometry unit 24.

When the shutter button 5 is fully pressed, the shutter control unit 28 drives a shutter to open and exposes a film to light from the object. Further, when the shutter button 5 is fully pressed, the aperture control unit 29 controls an aperture diaphragm (not shown) to define a necessary aperture value prior to exposure. The shutter speed and the aperture value are the values calculated by the CPU 60 based on the result of measurement of the light measuring unit 24.

Each time the object is photographed, a wind control unit 30 controls a winding mechanism (not shown) to wind a film by one frame. A mirror control unit 33 moves a quick return mirror (not shown) to a retracted position during photographing. A SW input unit 34 transmits the operational state of switches such as half or full depression of the shutter button 5, and operations of the other operation buttons to the CPU 60.

A strobe control unit 27 controls the light emission and charge of the strobe. A zoom lens drive unit 26 changes a focal length of a photographing lens by moving a zoom lens in accordance with the turning of a zoom ring (not shown). An AF lens drive unit 25 moves a focusing lens (not shown) to an in-focus position.

Figure 11:
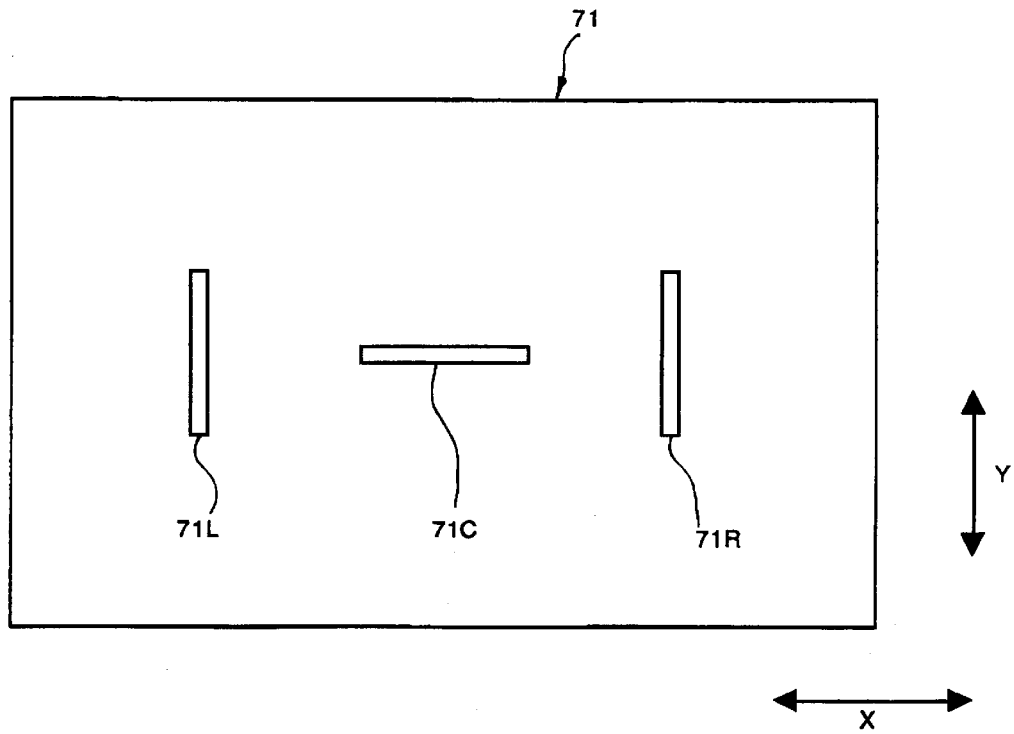
FIG. 11 shows an example of an AF areas within a finder field.

An R sensor 21, a C sensor 22 and an L sensor 23 are sensors corresponding to the AF areas 71R, 71C and 71L arranged in a finder field 71 shown in FIG. 11, respectively. After a light ray from the object is introduced into the camera through the photographing lens 1, light rays of the portions corresponding to the respective AF areas 71R, 71C and 71L are projected onto the R sensor 21, the C sensor 22 and the L sensor 23, respectively as a pair of images through an optical system. The CPU 60 obtains a defocus amount (or, the amount of displacement of the image plane with respect to the film surface and the direction of the displacement) in accordance with a phase difference method based on the images formed on the R sensor 21, the C sensor 22 and the L sensor 23. The CPU 60 further determines the amount of movement and the moving direction of a focusing lens to obtain an in-focus condition, and controls the AF lens drive unit 25 to move the focusing lens to the in-focus position.

A first auxiliary light drive unit 32 and a second auxiliary light drive unit 42 are connected to the CPU 60. The first auxiliary light drive unit 32 drives a first light source 31 to emit light. The light ray from the first light source 31 is emitted towards the object through a pattern plate 3P, on which a predetermined pattern is formed, and a lens 3L. The second auxiliary light drive unit 42 drives a second light source 41 to emit light. The light ray from the second light source 41 is emitted towards the object through a pattern plate 4P, on which a predetermined pattern is formed, and a lens 4L.

Figure 12:
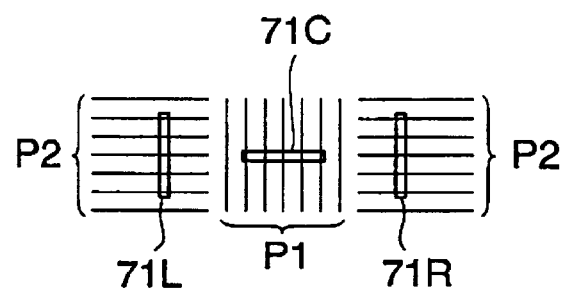
FIG. 12 is a view showing a conventional relationship between light patterns and the AF areas when the focal length of the photographing lens is relatively short.
Figure 13:
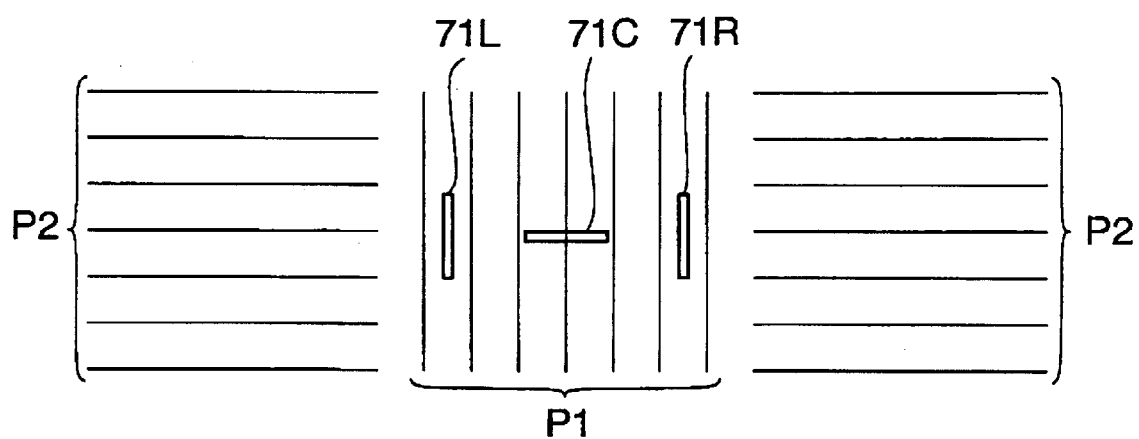
FIG. 13 is a view showing a conventional relationship between the light patterns and the AF areas when the focal length of the photographing lens is relatively long.

In the embodiment, as shown in FIG. 11, the AF areas 71R, 71C and 71L extend along the shorter side direction (Y direction in FIG. 11) or the longer side direction (X direction in FIG. 11) of the finder field 71. The patterns formed on the pattern plates 3P and 4P in correspondence to the above areas are either a first pattern P1 (see FIG. 12) having a plurality of lines extending in the shorter side direction of the finder field 71 and arranged along the longer side direction or a second patterns P2 (see FIG. 12) having a plurality of lines extending in the longer side direction of the finder field 71 and arranged along the shorter side direction thereof. The former pattern P1 is projected by a focusing condition detection process to the AF area 71C, and the latter patterns P2 are projected by a focusing condition detection process to the AF areas 71R and 71L.

Figure 3:
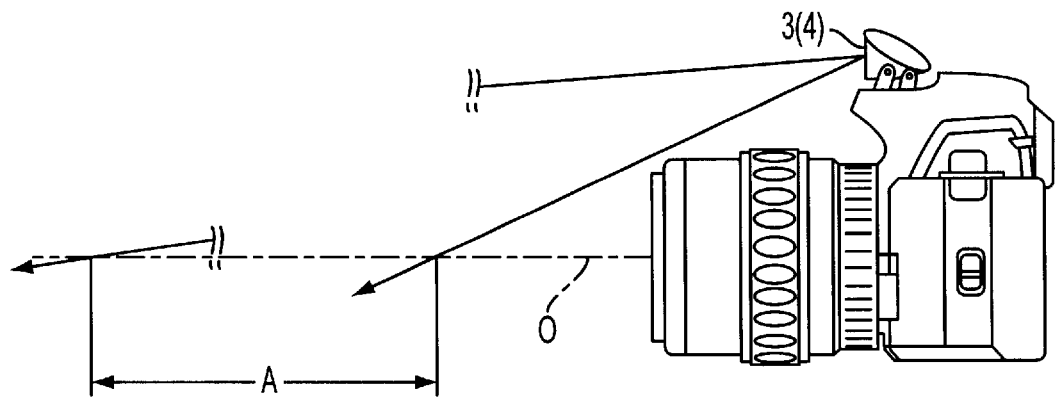
FIG. 3 is a side view of the camera shown in FIG. 1 illustrating how light rays are emitted from auxiliary light emitting units.

FIG. 3 is a side view of the camera 100 and shows how the light rays emitted from the first and second auxiliary light emitting units 3 and 4 proceed.

A light ray emitted from the light source 31 passes through the pattern plate 3P and the lens 3L, and spreads over a range A on the optical axis O of the photographing lens 1 as shown in FIG. 3. Similarly, the light ray emitted from the light source 41 passes through the pattern plate 4P and the lens 4L, and also spreads over the range A on the optical axis O of the photographing lens 1 as shown in FIG. 3. That is, an auxiliary light pattern is always projected onto the object at any position where the object intersects the optical axis O as long as the object is located within the range A. The positions of the lenses 3L, 4L, the pattern plates 3P, 4P and the first and second light sources 31, 41 are designed such that the range A is defined as a distance range, from the camera, from about ten or twenty centimeters to ten or more meters. In other words, at least within the range A defined as above, the first and second auxiliary light patterns P1 and P2 which are projected towards an object in the vicinity of the optical axis of the photographing lens are projected to approximately the same area.

Figure 4:
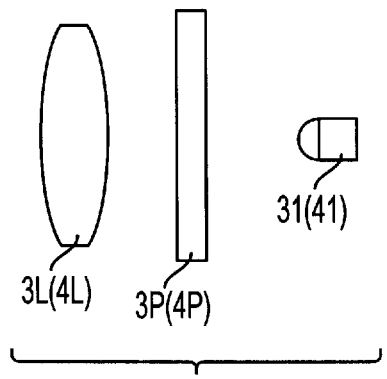
FIG. 4 is a schematic side view showing the arrangement of a light source, a pattern plate and a lens.

FIG. 4 is a schematic view showing the arrangement of the first light source 31, the pattern plate 3P and the lens 3L according to a preferred embodiment. Note, since the second light source 41 is arranged similarly to the first light source 31 except that a pattern formed on the pattern plate 4P is different from that formed on the pattern plate 3P, the components relating to the second light source unit 41 are shown in the drawing with their reference numerals in parentheses.

A light emitting diode (LED) is used as the light source in a preferred embodiment. The pattern plate 3P is composed of a light shielding plate to which the first pattern P1 is formed as slits. The focal length of the lens 3L ranges from about several millimeters to a centimeter plus several millimeters, and the distance from the lens 3L to the pattern plate 3P is set approximately similar to the focal length of the lens 3L.

Similarly, the pattern plate 4P is composed of a light shielding plate to which the second pattern P2 is formed as slits. The focal length of the lens 4L ranges from about several millimeters to a centimeter plus several millimeters, and the distance from the lens 4L to the pattern plate 4P is set approximately similar to the focal length of the lens 4L.

Figure 5:
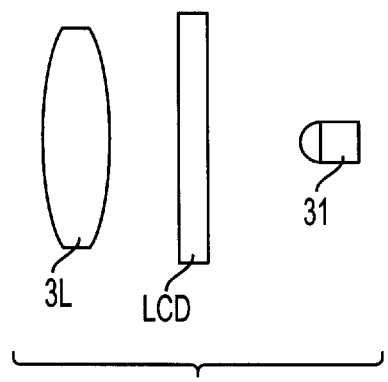
FIG. 5 shows a modification of the light source unit shown is FIG. 4.

FIG. 5 shows a modification of the light source unit. The light source and the lens are similar to those shown in FIG. 4, and an LCD having a transparent electrode is used as an alternative to the pattern plates 3P and 4P. In this case, it is possible to form either of the patterns P1 and P2 by driving the LCD. Therefore, when the light source unit shown in FIG. 5 is used, the light source unit can project light-patterns towards an object corresponding to respective AF areas by dividing the projection time, with use of a single light source, a single LCD plate and a single lens without the need of a pair of light sources.

Figure 6:
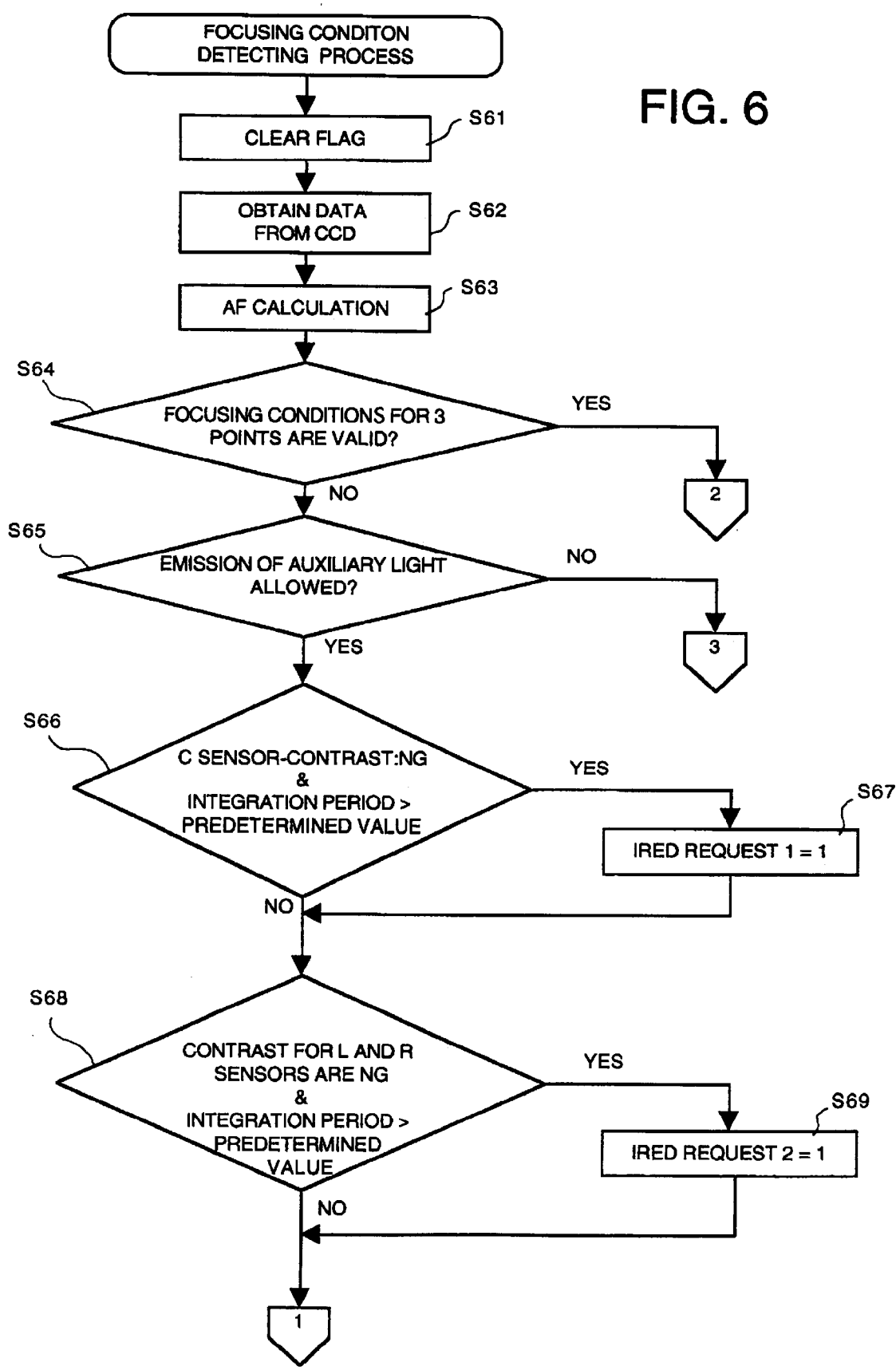
FIG. 6 is a flowchart illustrating, together with FIG. 7, a Focusing Condition Detection Process according to the present invention.
Figure 7:
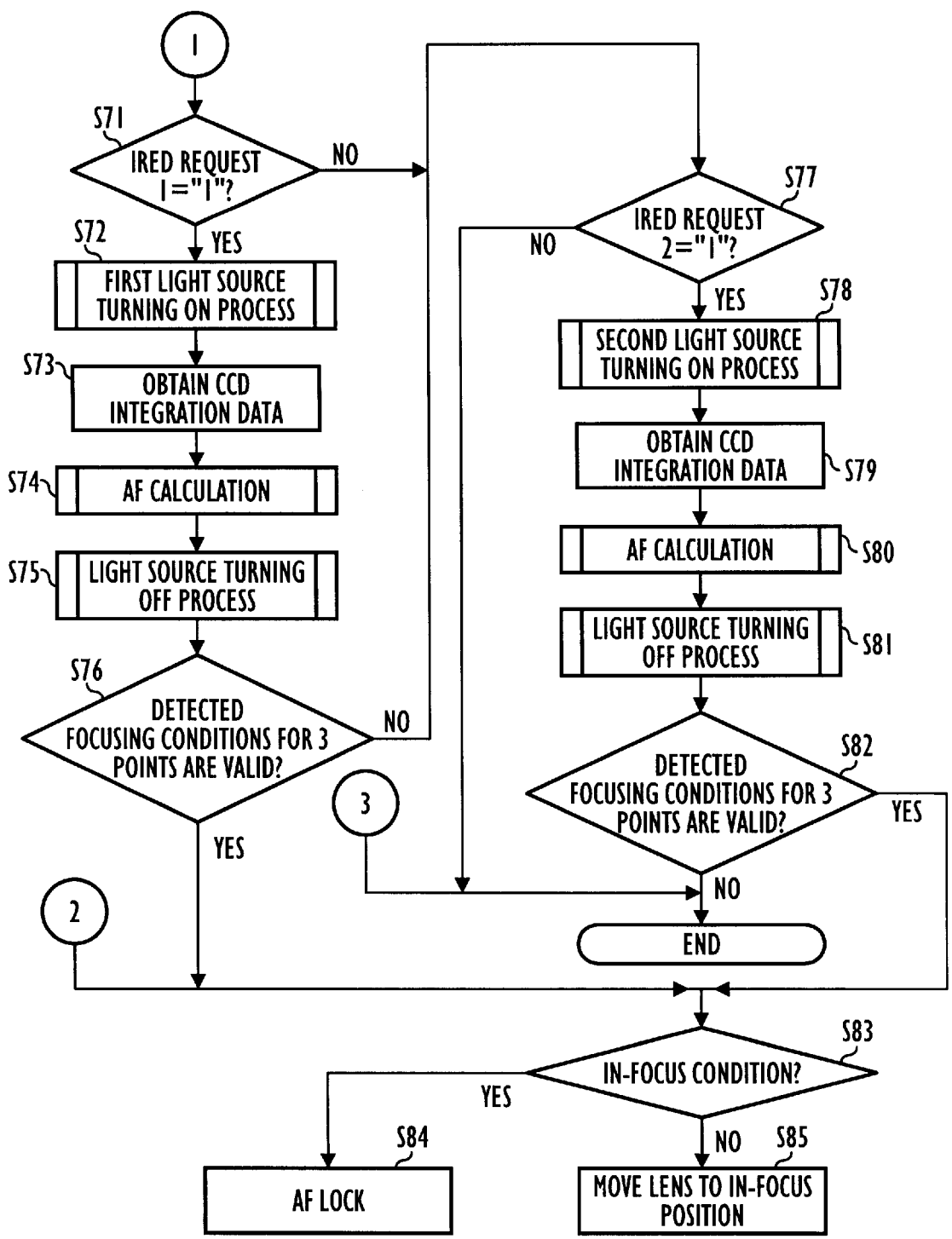
FIG. 7 is a flowchart illustrating, together with FIG. 6, the Focusing Condition Detection Process according to the present invention.

FIG. 6 and FIG. 7 show a flowchart illustrating a Focusing Condition Detection Process executed by the CPU 60. In a preferred embodiment, light patterns corresponding to the respective sensors are projected sequentially (i.e., light patterns are sequentially projected one after another, with a predetermined time lag), and the R sensor 21, the C sensor 22 and the L sensor 23 are driven sequentially, or synchronously with the projection of the corresponding light pattern so that the focusing condition detection is accurately executed with use of respective sensors. Note, since the R sensor 21 and the L sensor 23 use the same light pattern according to the embodiment, they are driven simultaneously.

The Focusing Condition Detection Process starts when a photographer presses the shutter button 5 of the camera 100 halfway.

First, the respective flags used in the following process (including IRED request flags 1 and 2 to be described below) are cleared (initial values are set to 0) at the beginning (step S61) of the Focusing Condition Detection Process. Next, the CPU 60 controls the R sensor 21, the C sensor 22 and the L sensor 23 to integrate the received light, and obtain data representative of the image formed on the respective sensors (step S62). Then, the CPU 60 executes the AF calculation (calculation for determining the defocus amounts for the respective AF areas) with use of a phase difference method based on the data obtained from the respective sensors (step S63).

In a preferred embodiment, there are three AF areas, and it is determined whether the focusing conditions are normally detected in the respective three areas (step S64). If the AF calculation is normally executed (step S64: YES) for at least one of the three areas (AF areas 71L, 71C and 71R), the process goes to step S83 of FIG. 7, and if the in-focus condition is achieved (step S83: YES), an AF lock processing is executed (step S84). The AF lock is a process for prohibiting the change of the focused condition even if the camera is directed to another direction while the shutter button 5 is pressed halfway. That is, when it is determined once that the in-focus condition is achieved at step S83, the position of the focusing lens is maintained unless the shutter button 5 is released from depression.

When it is determined at step S83 that the in-focus condition is not achieved (S83: NO), the CPU 60 controls the AF lens drive unit 25 to move the focusing lens to the in-focus position (step S85). Note, the in-focus condition is determined based on a result of a predetermined weighting process applied to the detection results of the focusing conditions for the three points.

If all the focusing conditions detected for the three points are abnormal (step S64: NO), it is determined whether the emission of an auxiliary light ray should be permitted (step S65). The abnormal state of the detected focusing condition means a case in which the result of calculation executed using the phase difference method lacks reliability, the defocusing amount cannot be calculated because a contrast is too low, or the like.

Although detailed explanation is omitted, the camera 100 has an operation mode in which the emission of the auxiliary light ray is prohibited. If the prohibition mode is selected, step S65 determines NO. Further, since the auxiliary light emitting units 3 and 4 are arranged adjacent to the pop-up strobe 2 in the camera 100, when the strobe 2 is not popped up, the auxiliary light emitting units 3 and 4 do not function. As a result, the auxiliary light ray emission prohibition mode is automatically selected and the determination at step S65 is always NO.

If the determination at step S65 is NO, since the result of measurement at the three points is not obtained, and the emission of the auxiliary light ray is prohibited, the program ends.

When the detection result for all the three points (the AF areas 71R, 71C and 71L) are NG (when they are not normal), and when the emission of the auxiliary light ray is permitted (S65: YES), determination is first made as to the C sensor 22 at step S66. It is determined at step S66 whether or not the detection result by the C sensor 22 indicates that the contrast is NG (too low) and the integration time is longer than a predetermined time.

The auxiliary light ray is effective as a subsidiary measure for detecting a focusing condition when the contrast is low. However, even if a focusing condition cannot be normally detected due to the low contrast, if the object is sufficiently bright, the emission of the auxiliary light ray cannot be sufficiently effective. In such a case, i.e., when the brightness of the object is sufficiently high, it is probable that the signal necessary to determine the defocus amount cannot be obtained. Therefore, when the object is bright (that is, when the integration time is equal to the predetermined time or lower), the auxiliary light ray is not emitted even if the contrast is NG (i.e., too low).

When it is determined YES at step S66, i.e., the contrast is too low and the integration time is greater than the predetermined period, at step S67, the flag IRED REQUEST 1 is set to "1" which indicates that the auxiliary light ray having the first light pattern P1 (see FIG. 12) is to be emitted.

A determination similar to that executed at step S66 is executed as to the L sensor and the R sensor at step S68.

If it is determined YES as to at least one of the L sensor or the R sensor at step S68, the flag IRED REQUEST 2 is set to "1" indicating an auxiliary light ray having the second light pattern P2 (see FIG. 12) is to be emitted.

Next, the CPU 60 proceeds to step S71 in FIG. 7 where it is determined whether the flag IRED REQUEST 1 is set to "1" or not. When the IRED REQUEST 1 flag equals to "1" (S71: YES), a subroutine First Light Source Turning On Process is executed at step S72.

The process of subroutine First Light Source Turing On Process is shown in FIG. 8 in which when a focusing motor is not driven (step S86: NO), the first light source 31 is lit to project the first pattern P1 towards the object (step S88) and this state is maintained for a predetermined time until the amount of an emitted light ray is stabilized (step S89) and the process returns to a position where it was called. If a focusing motor is being driven (step S86: YES), the above steps S88 and S89 are not executed and the process returns to a position where the sub routine was called.

The CCD integration is executed by the C sensor and data is obtained in a state in which the first pattern P1 is projected to the object (step S73). Next, the CPU 60 executes the AF calculation based on the obtained data (step S74). After the execution of the AF calculation is finished, the auxiliary light ray is turned OFF at Step S75 by light Source Turning Off Process (see FIG. 10).

If any one of the detection results for the three points is made effective by the AF calculation based on the integration made by the C sensor and the AF calculation result corresponding to the area 71C is obtained as described above (S76: YES), the process goes to step S83 where the AF is locked or the focusing lens is moved for focusing depending on whether the in-focus condition has been achieved or not.

When the IRED REQUEST 1 is not set with "1" at step S71, that is, when the AF calculation is normally executed from the signal output from the C sensor, an auxiliary light ray corresponding to the C sensor is not emitted, and it is determined at step S77 whether the IRED REQUEST 2 is set to "1" or not. When all of the detected focusing conditions corresponding to the R, C and L sensors are invalid, (S76: NO) the determination at S77 is also made.

If the IRED REQUEST 2 is not set to "1" (S77: NO), the processing ends. If the IRED REQUEST 2 is set to "1" (S77: YES), the CPU 60 executes a subroutine Second Light Source Turning On Process.

The subroutine Second Light Source Turning On Process is a process shown in FIG. 9, and when the focusing motor is not driven (step S90: NO), the second light source 41 is lit and the second pattern P2 is projected towards the object (step S92). This state is maintained for a predetermined time until the amount of an emitted light ray is stabilized (step S93) and the process returns to a position where the subroutine was called. When the focusing motor is being driven (step S90: YES), steps S92 and S93 are skipped, and the process returns to a position where the subroutine was called.

The CCD integration is executed by the L and R sensors and data is obtained in a state in which the second pattern P2 is projected to the object by the Second Light Source Turning On Process (step S79). Further, the CPU 60 executes the AF calculation based on the obtained data (step S80). After the execution of the AF calculation is finished, the CPU 60 turns OFF the auxiliary light ray in the (step S81) in the Light Source Turning Off Process shown in FIG. 10.

It is determined whether any one of the detection results for the three points is made effective or not (step S82) after the result of detection for the AF areas 71L, 71R is obtained based on the data of the R sensor and L sensor as described above. When the determination is NO, the process ends. When the determination at step S82 is YES, the process goes to step S83 and the CPU 60 locks AF or moves the focusing lens for focusing based on whether the in-focus condition is achieved or not.

Figure 10:
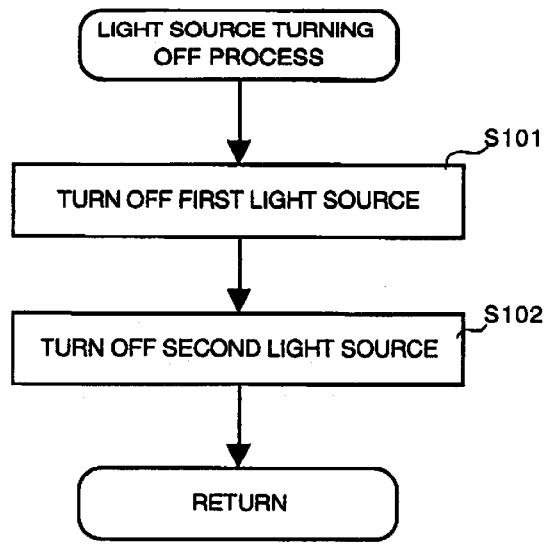
FIG. 10 is a flowchart showing a First Light Turning Off Process according to an aspect of the present invention.

FIG. 10 shows the logical flow of the Light Source Turning Off Process where the first light source 31 and the second light source 41 are merely turned Off (steps S101 and S102). The process then returns to a position where the subroutine was called.

As described above, focusing conditions can be accurately detected because the respective sensors execute integration in a state that the respective light patterns are projected, without another pattern being overlapped, in such a manner that the first auxiliary light emitting unit 3 and the second auxiliary light emitting unit 4 and the C sensor and the L and R sensors corresponding thereto are controlled sequentially as described above.

Note, although the single-lens reflex camera 100 is used in the embodiment, the present invention is also applicable to any camera such as a so-called compact camera which detects a focusing condition by the phase difference method, a camera obtaining an image signal by a CCD or the like without using a silver salt film.

Note, although the embodiments described above calculate the amount of movement of the focusing lens by using the result of focusing condition detection, and move the focusing lens to a focusing position, the present invention is not limited to such a focusing system. The auxiliary light emitting device and the focusing condition detecting device of the present invention are also applicable to display a focusing condition when, for example, focusing is executed manually.

As described above, in the focusing condition detecting device having a plurality of sensors and using the phase difference method, the respective patterns corresponding to the respective sensors can be projected to a sufficiently wide area without being overlapped by sequentially driving the auxiliary light emitting units for projecting the patterns. As a result, even if the size of the AF area is changed by zooming or the like, since a light pattern corresponding to each sensor can be securely projected without being overlapped with other light pattern, a focusing condition can be accurately detected at all times.

The present disclosure relates to subject matter contained in Japanese Patent Application No. HEI 08-156041, filed on May 28, 1996, which is expressly incorporated herein by reference in its entirety.

What is claimed is:

1. An auxiliary light emitting device for a focusing condition detecting device having a plurality of sensors for obtaining the focusing condition of a focusing lens with respect to an object based on a light ray from the object using a phase difference method, said auxiliary light emitting device comprising:

a light emitter comprising, a plurality of light emitting units, each of the plurality of light emitting units projecting light, having a plurality of light patterns respectively corresponding to said plurality of sensors, to the object, each of the plurality of light emitting units emitting a different one of the plurality of light patterns; and a controller, which drives said light emitter to emit said plurality of light patterns sequentially, the controller controlling the plurality of light emitting units to drive one of the plurality of light emitting units to emit a light pattern at one time;

wherein the plurality of sensors comprises at least a first sensor and a second sensor, the first and second sensors extending along a common plane and in different directions, and wherein the plurality of light patterns comprises a first pattern and a second pattern, the first and second patterns corresponding to the at least first and second sensors.

2. The auxiliary light emitting device according to claim 1, wherein each of said light emitting unit includes:

a light source;

a lens; and a light shielding plate, a light transmitting pattern corresponding to one of said light pattern being formed on said light shielding plate.

3. The auxiliary light emitting device according to claim 1, wherein said light emitter comprises:

a light source;

a lens; and a liquid crystal provided with transparent electrodes, said transparent electrodes being arranged to form said plurality of light patterns in response to electricity applied thereto.

4. The focusing condition detecting device according to claim 1, wherein said first sensor is for detecting the focusing condition of an object located at a position corresponding to a substantially central portion of a finder field of said camera, and said light emitter emits said first pattern for said first sensor prior to said second pattern.

5. The focusing condition detecting device according to claim 4, wherein a pair of second sensors are provided, said pair of second sensors being located symmetrically with respect to said first sensor, for detecting focusing conditions of the object corresponding to positions symmetrical with respect to the center of said finder field, and wherein said light emitter emits said second pattern for said pair of second sensors.

6. The focusing condition detecting device according to claim 1, wherein said first pattern includes a plurality of lines of illuminating portions, said plurality of lines of illuminating portions extending in a direction perpendicular to a direction in which said first sensor extends, said plurality of lines of illuminating portions arranged along a direction in which said first sensor extends, and wherein said second pattern includes a plurality of lines of second illuminating portions, said plurality of lines of second illuminating portions extending in a direction perpendicular to a direction in which said second sensor extends, said plurality of lines of second illuminating portions arranged along a direction in which said second sensor extends.

7. A focusing condition detecting device used in a camera having a focusing lens, comprising:
   a plurality of sensors, each of said plurality of sensors outputting a signal representative of a focusing condition at different areas within a finder field of said camera;
   a light emitter which projects light having a plurality of light patterns to the object, said plurality of light patterns respectively corresponding to said plurality of sensors; and
   a controller which drives said light emitter to sequentially emit said plurality of light patterns, the controller controlling the plurality of light emitters such that only one of the plurality of light emitting units is driven to project a light pattern at one time;
   wherein the plurality of sensors comprise at least a first sensor and a second sensor, the at least first sensor and second sensor extending along a common plane in different directions, and wherein the plurality of light patterns comprise a first pattern and a second pattern, the first and second patterns respectively corresponding to the at least first and second sensors.

8. The focusing condition detecting device according to claim 7, wherein said controller determines focusing conditions at said different areas assigned within said finder field based on said signal output from each of said plurality of sensors in accordance with a phase difference method.

9. The focusing condition detecting device according to claim 7, wherein said first sensor is for detecting the focusing condition of an object located at a position corresponding to a substantially central portion of said finder field of said camera, and said light emitter emits said first pattern for said first sensor prior to said second pattern.

10. The focusing condition detecting device according to claim 9, wherein a pair of second sensors are provided, said pair of second sensors being located symmetrically with respect to said first sensor for detecting focusing conditions of the object corresponding to positions symmetrical with respect to the center of said finder field, and wherein said light emitter emits said second pattern for said pair of second sensors.

11. The focusing condition detecting device according to claim 7, wherein said first pattern includes a plurality of lines of illuminating portions, said plurality of lines of illuminating portions extending in a direction perpendicular to a direction in which said first sensor extends, said plurality of lines of illuminating portions arranged along a direction in which said first sensor extends, and wherein said second pattern includes a plurality of lines of second illuminating portions, said plurality of lines of second illuminating portions extending in a direction perpendicular to a direction in which said second sensor extends, said plurality of lines of second illuminating portions arranged along a direction in which said second sensor extends.

12. The focusing condition detecting device according to claim 7, wherein said light emitter comprises a plurality of light emitting units, each of said plurality of light emitting units emitting a different one of said plurality of light patterns.

13. The focusing condition detecting device according to claim 12, wherein each of said light emitting units includes:
   a light source;
   a lens; and
   a light shielding plate, a light transmitting pattern corresponding to one of said light pattern being formed on said light shielding plate.

14. The auxiliary light emitting device according to claim 7, wherein said light emitter comprises:
   a light source;
   a lens; and
   a liquid crystal provided with transparent electrodes, said transparent electrode being arranged to form said plurality of light patterns in response to electricity applied thereto.

15. The focusing condition detecting device according to claim 7, wherein said controller controls each of said plurality of sensors to receive light from said object synchronously with projection of said plurality of light patterns.

16. The focusing condition detecting device according to claim 15, wherein at least two of said plurality of sensors correspond to one of said plurality of light patterns, and said controller drives said at least two sensors corresponding to the one light pattern simultaneously to receive light from the object when said one light pattern is projected.

17. The focusing condition detecting device according to claim 7, wherein said device is installed in a camera having a focusing lens, and wherein said controller calculates an amount of movement of said focusing lens based on the focusing condition detected by said plurality of sensors.

18. The focusing condition detecting device according to claim 7, wherein said controller determines which of said plurality of light patterns are to be projected based on the focusing condition detected by said plurality of sensors without projecting said plurality of light patterns.

19. The focusing condition detecting device according to claim 18, wherein said controller determines a light pattern is to be projected when a focusing condition detected by a corresponding sensor indicates that an object has a low contrast and low brightness.

20. An auxiliary light emitting device for a focusing condition detecting device having a plurality of sensors for obtaining the focusing condition of a focusing lens with respect to an object based on a light ray from the object using a phase difference method, the auxiliary light emitting device comprising:
   a light emitter which projects light, having a plurality of light patterns respectively corresponding to the plurality of sensors, to the object; and a controller which drives the light emitter to emit the plurality of light patterns sequentially;

wherein the light emitter comprises a light source, a lens, and a liquid crystal provided with transparent electrodes, the transparent electrodes being arranged to form the plurality of light patterns in response to electricity applied thereto.

21. A focusing condition detecting device used in a camera having a focusing lens, the device comprising:

a plurality of sensors, each of the plurality of sensors outputting a signal representative of a focusing condition at different areas within a finder field of said camera;

a light emitter which projects light having a plurality of light patterns to the object, the light emitter including a light source, a lens, a light shielding plate, and a light transmitting pattern corresponding to one of the plurality of light patterns being formed on the light shielded plate, the plurality of light patterns respectively corresponding to the plurality of sensors, the light emitter comprising a plurality of light emitting units, each of the plurality of light emitting units emitting a different one of the plurality of light patterns; and a controller which drives the light emitter to sequentially emit the plurality of light patterns.

22. The auxiliary light emitting device of claim 1, each sensor being driven synchronously with the projection of the corresponding light pattern.

23. The focusing condition detection device of claim 7, each sensor being driven synchronously with the projection of the corresponding light pattern.

* * * * *

UNITED STATES PATENT AND TRADEMARK OFFICE
CERTIFICATE OF CORRECTION

PATENT NO. : 5,870,637
DATED : August 23, 1999
INVENTOR(S) : T. SENSUI

It is certified that error appears in the above-identified patent and that said Letters Patent is hereby corrected as shown below:

At column 12, line 58 (claim 19, line 5) of the printed patent, after "and" insert ---a---.

Signed and Sealed this

Twenty-second Day of February, 2000

Attest:

Q. TODD DICKINSON

*Attesting Officer*    *Commissioner of Patents and Trademarks*